United States Patent
Bower et al.

(10) Patent No.: US 10,728,727 B2
(45) Date of Patent: Jul. 28, 2020

(54) SYSTEMS AND METHODS FOR REDUCING INTERFERENCE IN WIRELESS COMMUNICATION AMONG COMPUTING DEVICES

(71) Applicant: Lenovo Enterprise Solutions (Singapore) Pte. Ltd., New Tech Park (SG)

(72) Inventors: Fred A. Bower, Durham, NC (US); Charles C. Queen, Apex, NC (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 483 days.

(21) Appl. No.: 15/061,161

(22) Filed: Mar. 4, 2016

(65) Prior Publication Data
US 2017/0257729 A1    Sep. 7, 2017

(51) Int. Cl.
| | |
|---|---|
| H04W 4/00 | (2018.01) |
| H04M 1/725 | (2006.01) |
| H04B 5/00 | (2006.01) |
| H04W 28/16 | (2009.01) |
| H04W 4/80 | (2018.01) |
| H04W 76/14 | (2018.01) |

(52) U.S. Cl.
CPC .......... *H04W 4/80* (2018.02); *H04B 5/0031* (2013.01); *H04M 1/7253* (2013.01); *H04W 76/14* (2018.02)

(58) Field of Classification Search
CPC combination set(s) only.
See application file for complete search history.

(56) References Cited

U.S. PATENT DOCUMENTS

| | | | | |
|---|---|---|---|---|
| 6,115,612 A | * | 9/2000 | Fukuda | H04M 1/72502 455/517 |
| 6,473,507 B1 | * | 10/2002 | Eckert | H04M 1/74 379/399.01 |

(Continued)

FOREIGN PATENT DOCUMENTS

WO    WO 2015127761 A1 *   9/2015   ............ H04W 74/04

OTHER PUBLICATIONS

Wang Xuehuan; CN 104883708 Translation; Sep. 2, 2015.*

(Continued)

*Primary Examiner* — Yuwen Pan
*Assistant Examiner* — Erica L Fleming-Hall
(74) *Attorney, Agent, or Firm* — Olive Law Group, PLLC

(57) ABSTRACT

Systems and methods for reducing interference in wireless communication among computing devices are disclosed herein. In accordance with an aspect, a first wireless communication device is provided that is operably connected to a first server and configured to wirelessly communicate information associated with the first server. The method includes determining, at the first wireless communication device, presence of a second wireless communication device operably connected to a second server. The method also includes negotiating with the second wireless communication device to establish a plan for sharing wireless communication airspace between the first wireless communication device and the second wireless communication device. Further, the method includes controlling communication based on the plan for sharing wireless communication airspace.

14 Claims, 11 Drawing Sheets

(56) References Cited

U.S. PATENT DOCUMENTS

| | | | | |
|---|---|---|---|---|
| 6,882,851 | B2* | 4/2005 | Sugar | H04W 16/14 455/113 |
| 8,620,863 | B2* | 12/2013 | Arthursson | G06F 9/45504 707/613 |
| 9,736,875 | B2* | 8/2017 | Wietfeldt | H04W 76/023 |
| 9,839,041 | B2* | 12/2017 | Tolentino | H04W 72/085 |
| 10,477,461 | B2* | 11/2019 | Lee | H04W 48/16 |
| 2004/0116073 | A1* | 6/2004 | Mauney | H04M 1/72519 455/41.2 |
| 2004/0192293 | A1* | 9/2004 | Karabinis | H04B 7/18543 455/427 |
| 2006/0187890 | A1* | 8/2006 | Lin | H04W 88/02 370/338 |
| 2007/0250393 | A1* | 10/2007 | Alberth, Jr. | G06Q 20/102 705/26.41 |
| 2008/0205315 | A1* | 8/2008 | Park | H04W 76/34 370/310 |
| 2010/0211625 | A1* | 8/2010 | Gonzalez Plaza | G06F 9/4862 709/202 |
| 2010/0235429 | A1* | 9/2010 | Simonen | H04L 63/0492 709/203 |
| 2010/0322210 | A1* | 12/2010 | Minapalli | H04W 72/0493 370/337 |
| 2012/0201156 | A1* | 8/2012 | Sugimoto | H04B 1/0064 370/252 |
| 2012/0281683 | A1* | 11/2012 | Falconetti | H04J 11/0023 370/336 |
| 2012/0306775 | A1* | 12/2012 | Miyachi | G06F 3/03545 345/173 |
| 2012/0309522 | A1* | 12/2012 | Westlund | H04N 13/0018 463/31 |
| 2013/0080513 | A1* | 3/2013 | Debate | H04L 12/1854 709/203 |
| 2013/0273857 | A1* | 10/2013 | Zhang | H04B 15/00 455/73 |
| 2014/0120837 | A1* | 5/2014 | Abiri | H04W 28/02 455/41.2 |
| 2014/0220888 | A1* | 8/2014 | Shimshoni | H04B 5/0056 455/41.1 |
| 2014/0257905 | A1* | 9/2014 | Zimmermann | G06Q 10/1095 705/7.19 |
| 2014/0269207 | A1* | 9/2014 | Baym | G10K 11/26 367/138 |
| 2014/0269208 | A1* | 9/2014 | Baym | G10K 11/26 367/138 |
| 2014/0301261 | A1* | 10/2014 | Godor | H04W 52/0229 370/311 |
| 2014/0304773 | A1* | 10/2014 | Woods | H04L 63/08 726/3 |
| 2014/0328290 | A1* | 11/2014 | de la Broise | H04W 72/1215 370/329 |
| 2014/0335907 | A1* | 11/2014 | Hyde | H04B 7/26 455/517 |
| 2015/0156783 | A1* | 6/2015 | Klang | H04W 72/082 455/436 |
| 2015/0249937 | A1* | 9/2015 | Lindoff | H04W 36/0011 370/331 |
| 2015/0264626 | A1* | 9/2015 | Perdomo | H04W 40/12 370/216 |
| 2015/0281874 | A1* | 10/2015 | Cheng | H04B 15/00 455/41.1 |
| 2015/0317621 | A1* | 11/2015 | Jin | G06Q 20/3224 705/44 |
| 2016/0007336 | A1* | 1/2016 | Fukuta | H04W 76/10 455/426.1 |
| 2016/0066216 | A1* | 3/2016 | Kim | H04W 16/28 370/348 |
| 2016/0066356 | A1* | 3/2016 | Lindoff | H04W 52/383 370/329 |
| 2016/0150400 | A1* | 5/2016 | Cha | H04W 76/14 455/418 |
| 2016/0227014 | A1* | 8/2016 | Takagi | H04M 1/7253 |
| 2016/0227596 | A1* | 8/2016 | Otani | H04N 5/23206 |
| 2016/0330758 | A1* | 11/2016 | Cheng | H04L 1/00 |
| 2017/0078160 | A1* | 3/2017 | Hong | H04L 67/32 |
| 2017/0245269 | A1* | 8/2017 | Ezaki | H04W 72/0446 |
| 2017/0303260 | A1* | 10/2017 | Peng | H04W 72/048 |
| 2018/0007724 | A1* | 1/2018 | Kazmi | H04W 8/005 |
| 2018/0020463 | A1* | 1/2018 | Liao | H04W 72/1231 |

OTHER PUBLICATIONS

Pratas, Nuno K. "Network-Assisted Device-to-Device (D2D) Direct Proximity Discovery with Underlay Communication." Department of Electronic Systems, Aalborg University, Denmark, Aug. 13, 2015. Web. Jan. 14, 2016. <http://arxiv.org/pdf/1508.03186.pdf>.

Cisco. "Time Division Multiple Access (TDMA)." Cisco, Jun. 9, 2009. Web. Jan. 14, 2016. <https://supportforums.cisco.com/document/6216/time-division-multiple-access-tdma>.

* cited by examiner

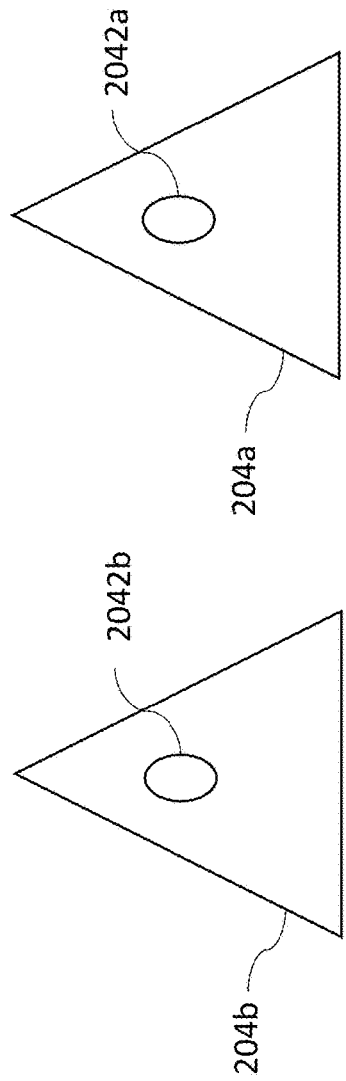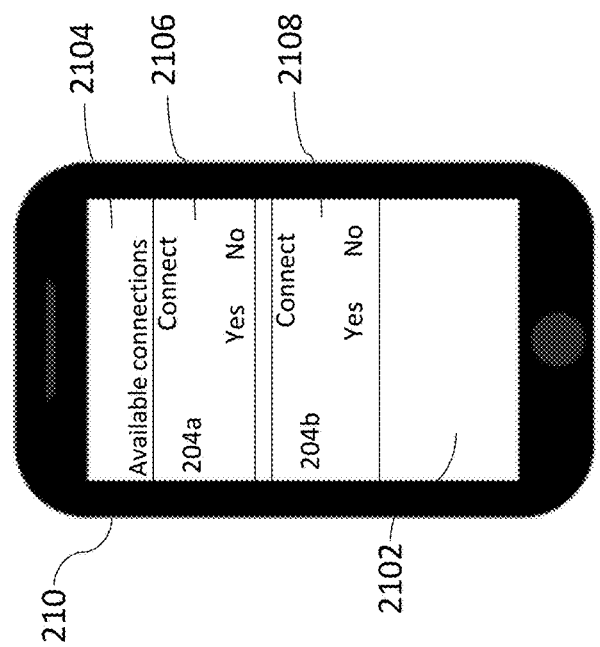
FIG. 2B
FIG. 2C

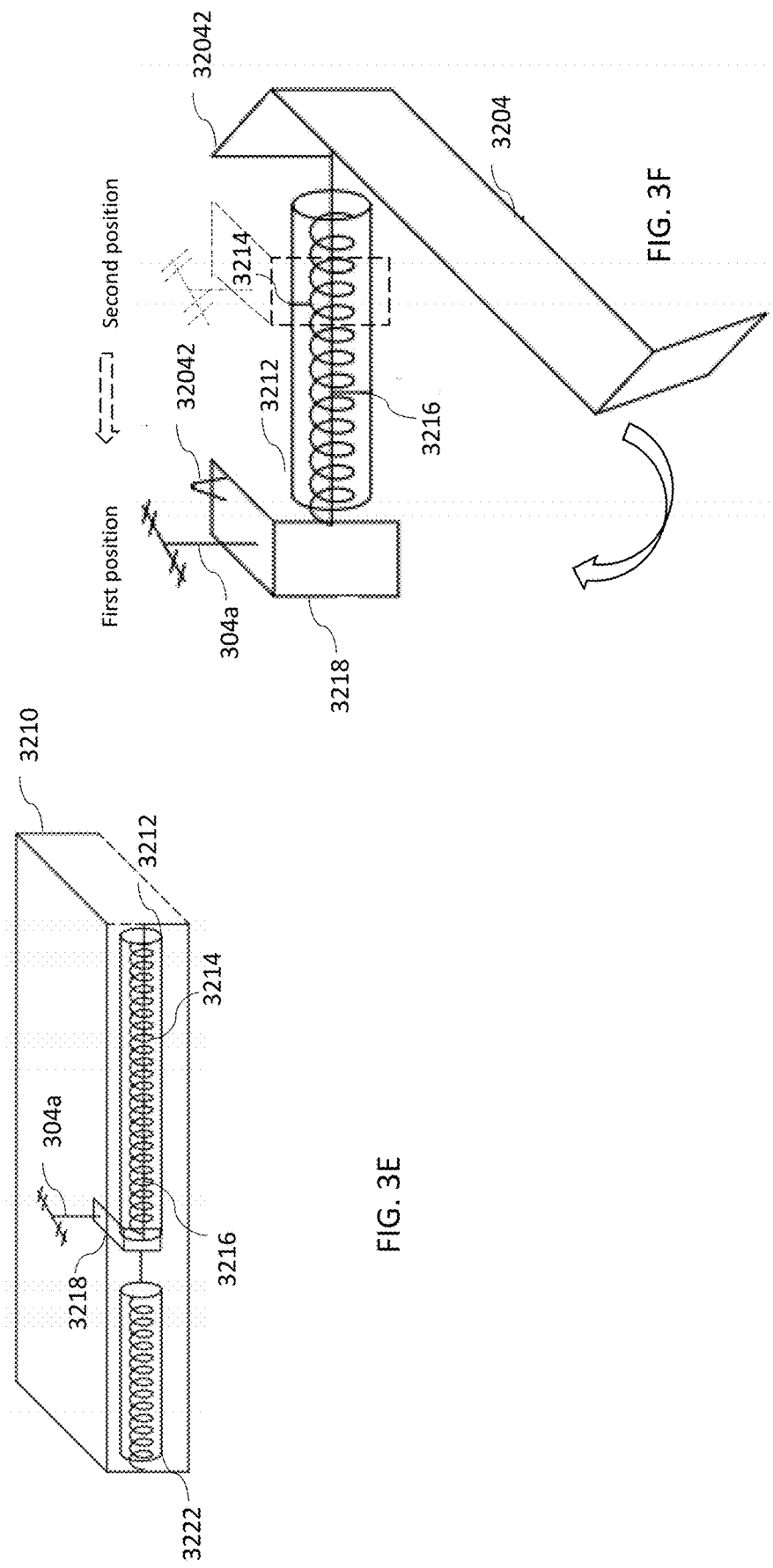

SYSTEMS AND METHODS FOR REDUCING INTERFERENCE IN WIRELESS COMMUNICATION AMONG COMPUTING DEVICES

TECHNICAL FIELD

The presently disclosed subject matter relates to wireless communications. More specifically, the presently disclosed subject matter relates to improving the fidelity of device pairing between a user-held device and fixed equipment in a densely-packed array of short-range radio antennae.

BACKGROUND

Short-range radio communication devices are increasingly utilized to provide a convenient means of interacting with elements in a computer data center. It is becoming common place to have built-in antennae in every element installed in a rack of equipment. Users interact with these antennae by bringing a handheld device within communication range of the antenna location. When densely packed, the zones where antennae will pair with the handheld device often overlap, resulting in situations where the handheld device pairs with an antenna unintended by the end user. To avoid this problem, two techniques are primarily utilized. In one technique, the wireless devices are physically placed at a sufficient distance from one another so that it avoids the overlapping communication zones altogether. However, there is a drawback of this technique, that it constrains the physical space and the achievable density of installed radios in a container.

The second technique is to have the wireless devices require some form of activation automatically or at a user's request so that user is able to control which wireless device is active at a given moment. However, this technique also has a drawback, as the user has to go through an additional activation step prior to exchanging data over wireless communication channel which may be cumbersome at scale.

Another alternative for interference avoidance is the use of high-power wireless devices with fewer antennae in overall solution. This technique, however, may be less desirable than others as it requires some form of aggregation infrastructure which generally does not exist. It may also require deactivation of pre-installed antennae in equipment installed in the rack.

In view of the foregoing, there is a need for a solution to detect overlapping airspace situations and to trigger automatic or user assisted remediation.

SUMMARY

Systems and methods for improving device pairing fidelity in wireless communication among computing devices are disclosed herein. In accordance with an aspect, a first wireless communication device is provided that is operably connected to a first server and configured to wirelessly communicate information associated with the first server. The method includes determining, at the first wireless communication device, presence of a second wireless communication device operably connected to a second server. The method also includes negotiating with the second wireless communication device to establish a plan for sharing wireless communication airspace between the first wireless communication device and the second wireless communication device. Further, the method includes controlling communication based on the plan for sharing wireless communication airspace.

According to another aspect, a computing device including one or more processors and memory is provided. The computing device includes a first wireless communication device operably connected to the at least one processor and memory and configured to wirelessly communicate information associated with the at least one processor. The first wireless communication device is configured to determine presence of a second wireless communication device capable of interfering with communication of the first wireless communication device. The computing device also includes a mechanism configured to hold the first wireless communication device in one of a first position and a second position with respect to the at least one processor and memory. Further, the computing device includes a user interface operably connected to the first wireless communication device and configured to indicate the determined presence. In the first position, the second wireless communication device is not capable of interfering with attempts to pair a handheld device with the first wireless communication device. In the second position, the second wireless communication device is capable of interfering with attempts to pair a handheld device with the first wireless communication device.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

FIG. 2B is a diagram depicting light emitters of the first and second wireless devices shown in FIG. 2A;

FIG. 2C is a diagram depicting a user interface according to embodiments of the present disclosure;

FIGS. 3C, 3D, 3E, 3F, and 3G are block diagrams to depict a mechanical antenna sliding mechanism according to embodiments of the present disclosure;

DETAILED DESCRIPTION

Figure 1:
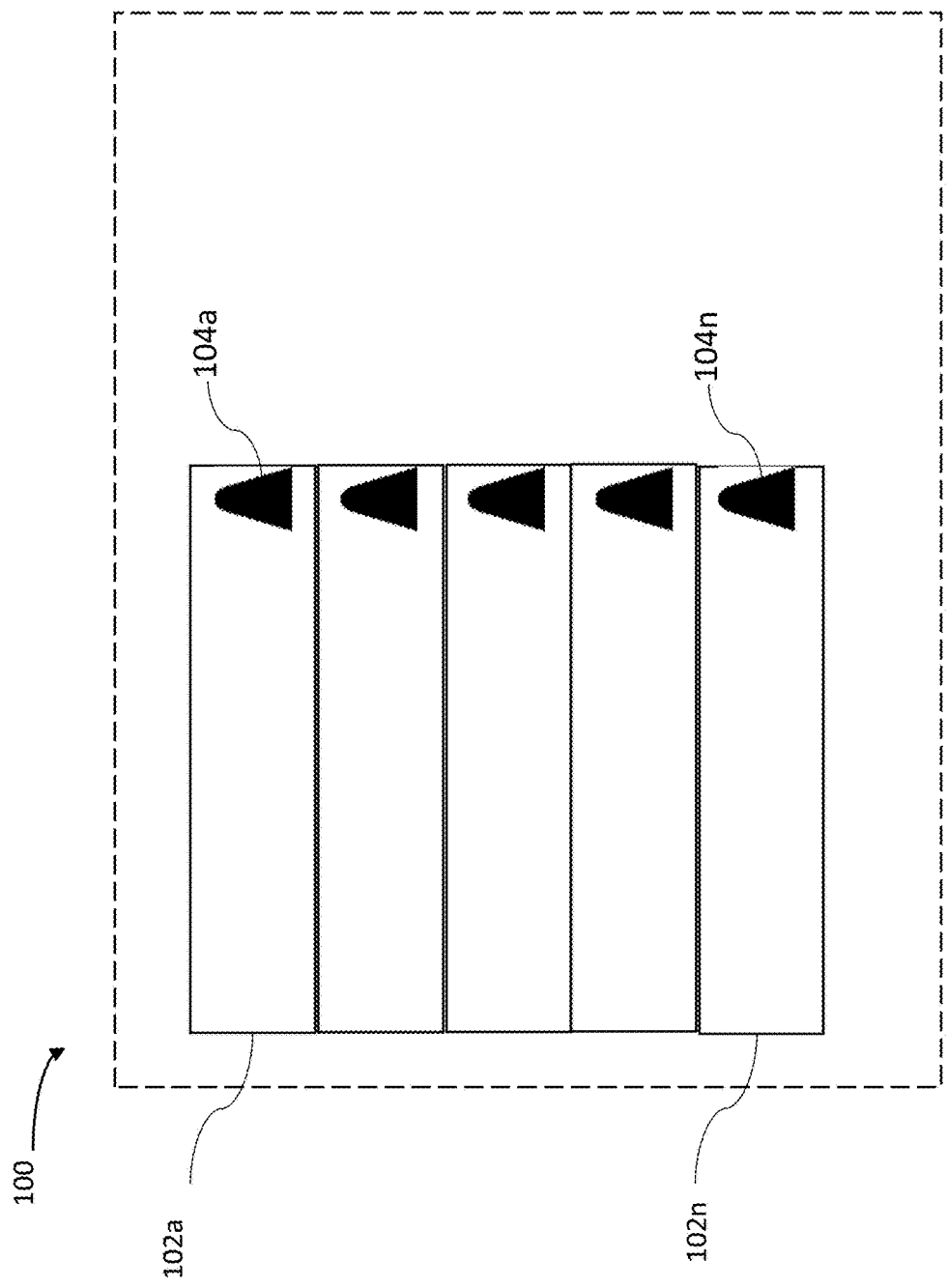
FIG. 1 depicts an example environment within which systems and methods according to embodiments of the present disclosure may operate.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the computing device and achieve the stated purpose of the computing device.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. In another example, the user can use any other suitable user interface of a computing device, such as a keypad, to select the display icon or display object. For example, the user can use a track ball or arrow keys for moving a cursor to highlight and select the display object.

As used herein, the term "memory" is generally a storage device of a computing device. Examples include, but are not limited to, ROM and RAM.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The present disclosure is now described in more detail. For example, FIG. 1 is an illustration of an example environment 100 within which systems and methods of the present disclosure may be implemented. In this example, environment 100 is a server farm that includes multiple servers 102a-102n placed in a stacked arrangement as will be understood by those of skill in the art. It is noted that a server farm (or server cluster) may be any grouping of servers that are maintained by an organization to supply server functionality. The servers in the server farm can provide additional computing functionality to other computing devices located remote from the server farm. Each of the multiple servers 102a-102n includes wireless devices 104a-104n respectively. According to embodiments of the present disclosure, the wireless devices 104a-104n can be powered near field communication (NFC) devices. As, already known in the art, NFC devices are capable of communicating wirelessly with other wireless devices in short range distances ranging up to about 4 inches.

Figure 2A:
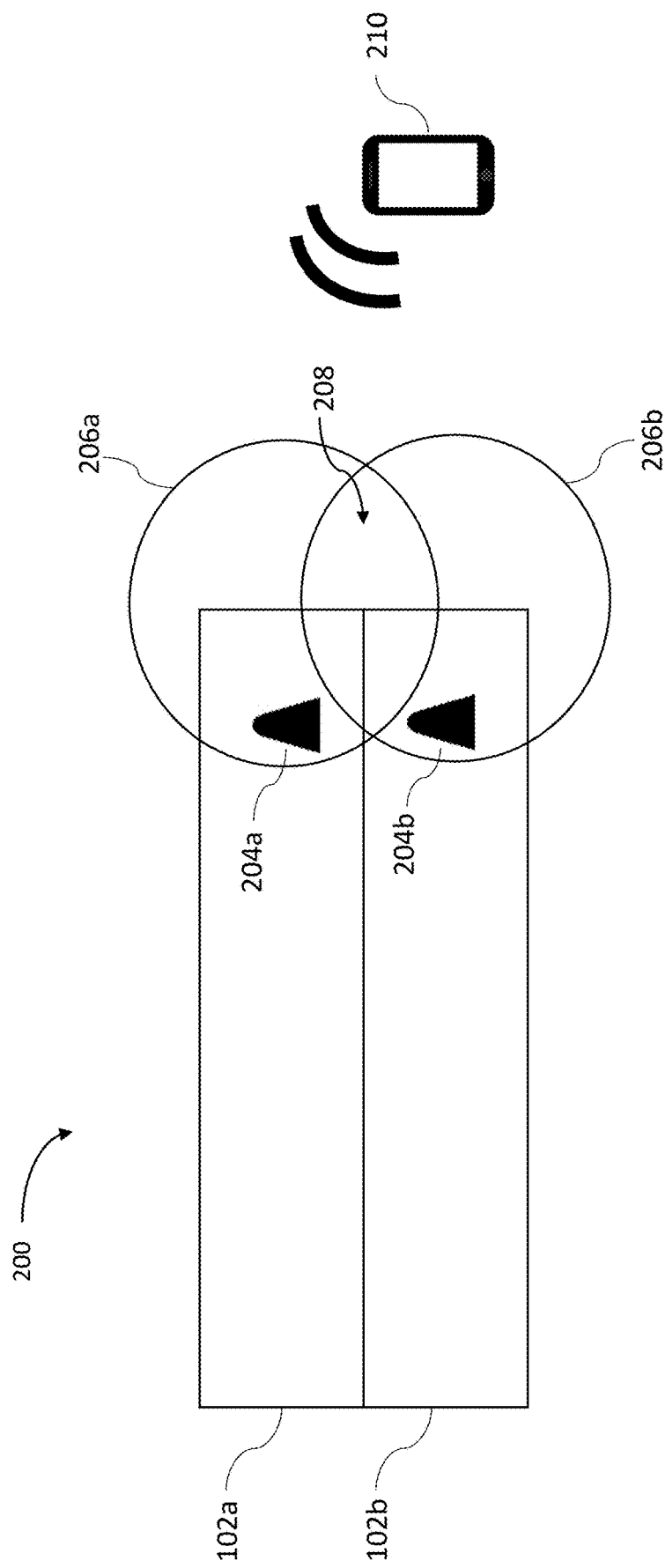
FIG. 2A is a diagram depicting an example system for reducing interference according to embodiments of the present disclosure.

Now referring to FIG. 2A, the figure illustrates an example system 200 for reducing interference in wireless communication in accordance with embodiment of the present disclosure. The system 200 includes servers 102a and 102b placed in a stacked manner as depicted in the example of the server farm 100 shown in FIG. 1. System 200 includes a first wireless device 204a and a second wireless device 204b that are connected to servers 102a and 102b, respectively. In embodiments of the present disclosure, the connection between the servers 102a and 102b and the wireless devices 204a and 204b may be a wired connection or a wireless connection. The wireless communication devices 204a and 204b are further configured to communicate information related to first server 102a and second server 102b wirelessly to a user device 210.

With continuing reference to FIG. 2A, second wireless device 204b may be further configured to determine presence of first wireless device 204a within a close proximity. Each of the first wireless device 204a and second wireless device 204b include antennae (not shown in the FIG. 2A) that have range of effect depicted generally by circles 206a and 206b, respectively. The range of effect 206a of the antenna of the first wireless device 204a spans into physical space occupied by the second wireless device 204b. Hence, the range of effect 206a of the first wireless device 204a overlaps with the range of effect 206b of the second wireless device 204b to form an interference region 208. The user device 210 when required to communicate to any one of the wireless devices 204a or 204b which the user chooses to and is required to be placed in an operational effect zone of the antennae of the wireless device with which the user device 210 is trying to make data exchange or transfer. When presence of first wireless device 204a has been determined, the second wireless device 204b can communicate with the first wireless device 204a in order to negotiate and establish a plan to share wireless communication airspace between them in order to communicate efficiently and without interference with the computing device 210. In simpler words interference as per the description of this application means incorrect pairing of the user device 210.

The sharing may be based on time slicing of airspace channel near the first wireless device 204a and second wireless device 204b according to embodiments of the present disclosure. The second wireless device 204b may subsequently communicate with the computing device 210 in accordance with the time communication time division plan. The time slicing of air space channel may be done in order to eliminate the interference that may be caused due to the wireless devices working in close proximity. In embodiments of the present disclosure, the time division plan may be that the first wireless device 204a is active for even intervals whereas the second wireless device 204b is active for another even interval wherein, the interval duration is negotiated between the wireless devices 204a, and 204b. The second wireless device 204b may include light emitter 2042b as depicted in FIG. 2B, in order to be activated in response to when the wireless device 204b is ready for connection with other devices. Also, the first wireless device 204a may also include a light emitter 2042a to achieve the same functionality. The light emitter 2042b can serve as a visual indicator to a user of the user device 210 in order to determine when the second wireless device 204b is in an active communicating stage. This may be implemented so that the user can avoid pairing of the user device 210 with the wrong wireless device. The second wireless device can be activated as per the negotiated time division plan in between the first wireless device 204a and the second wireless device 204b.

Now referring to FIG. 2C, the second wireless device 204b may also be operably connected to a user interface 2102. In accordance with embodiments of the present disclosure the user interface 2102 may be presented within the user device 210. The user interface 2102 is configured to receive input by a user in order to control and choose connection of the user device 210 to the available wireless devices. As shown in the FIG. 2B, according to embodiments of the present disclosure, the user interface 2102 is configured into various parts. Display portion 2104 may present to the user the available wireless devices for communication. Windows 2106 and 2108 may display to the user, name of wireless devices available like the first wireless device 204a or 204b respectively with areas of the user interface 2102 having an option to either connect or not by receiving the user's input. If the user chooses to connect to the second wireless device 204b, the second wireless device 204b can control the communication of the first wireless device 204a.

Figure 3A:
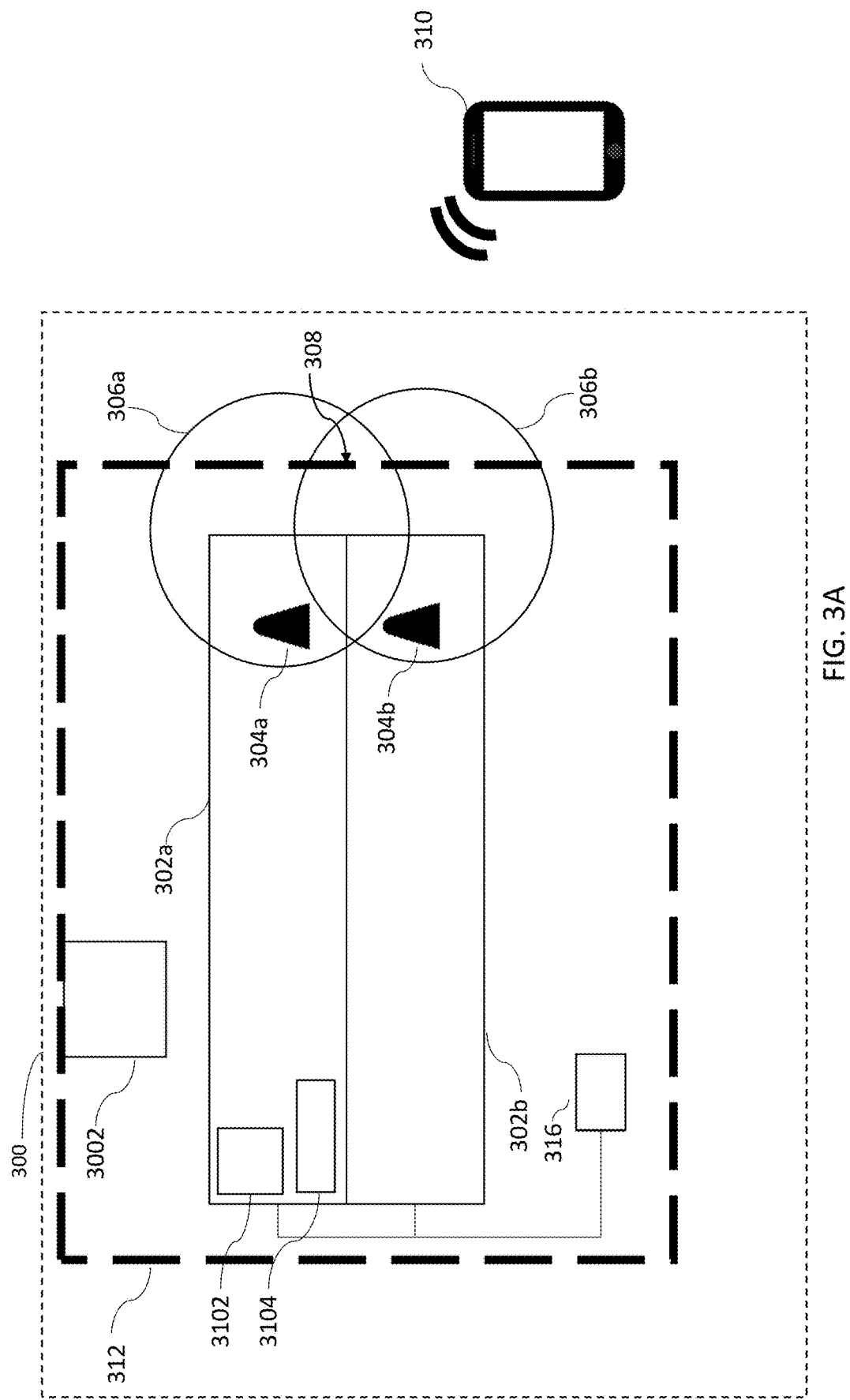
FIG. 3A is a block diagram depicting a computing device according to another aspect of the present disclosure.

Referring now to FIG. 3A, the figure depicts a computing device 300 including a memory 3102 and a processor 3104. The memory 3102 and processor 3104 may be operably connected to a first wireless device 304a through wired or wireless connections for the exchange of information or data. First wireless device 304a is also configured to determine presence of a second wireless device 304b in close proximity that may interfere with the wireless communication between first wireless communication device 304a and the computing device 310. The computing device 300 may include a user interface 3002. According to embodiments of the present disclosure, first server 302a and second server 302b are placed in a stacked position as depicted in the FIG. 3A. The servers 302a, and 302b include the first wireless device 304a, and the second wireless device 304b respectively which may be powered NFC devices. The servers 302a, and 302b may be mounted on a general server rack 312. Furthermore, the general rack 312 may include an electric motor 316 configured to shift the first wireless device 304a from a first position to a second position which will be discussed in detail while describing the example of FIG. 3C. It would be appreciated by a person ordinarily skilled in the art that this type of motor may also be placed external to the general server rack.

Each of the first wireless device 304a and second wireless device 304b include an antenna (not shown in the FIG. 3A) having a range of effect depicted by circles 306a and 306b, respectively. The range of effect 306a of the antenna of the first wireless device 304a spans into the physical space occupied by the second wireless device 304b. Hence, the range of effect 306a of the first wireless device 304a overlaps with the range of effect 306b of the second wireless device 304b to form interference region 308. When the user device 310 tries to communicate with any one of the wireless devices 304a, or 304b, the system may be configured to require it to be placed in an operational effect zone of the antenna with which the user device 310 is trying to make data exchange or transfer.

Figure 3B:
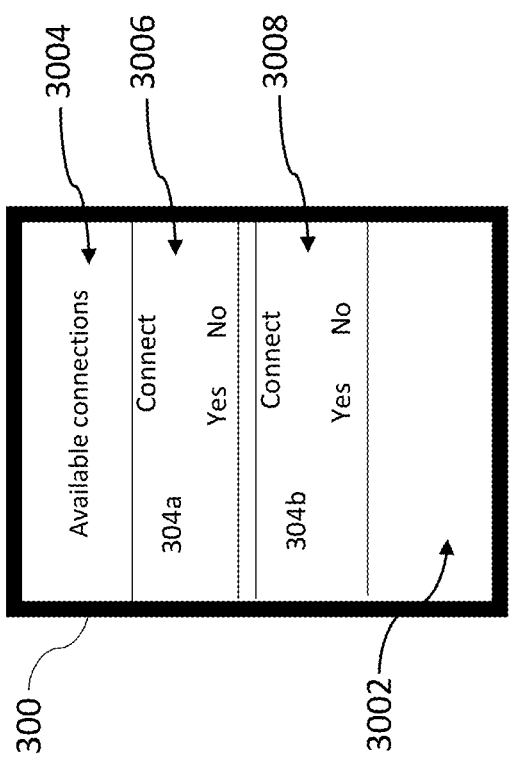
FIG. 3B is a diagram depicting user interface according to embodiments of the present disclosure.

Referring to FIG. 3B the computing device 300 may be provided with a user interface 3002 similar to the one as described in relation to the user device 210 described in description of FIG. 2B. In accordance with embodiments, the user interface 3002 may be displayed on a display of the user device 310. The user interface 3002 is configured to receive input by a user for use in controlling and selecting connection of the user device 310 to the available wireless devices. As shown in the FIG. 3A, the user interface 3002 is configured into various parts. Display portion 3004 displays to the user the available wireless devices for communication. Windows 3006 and 3008 may display to the user name of wireless devices available such as the first wireless device 304a or 304b respectively with areas of the user interface 3002 having an option to either connect or not by receiving the user's input. If the user chooses to connect to the first wireless device 304a then the first wireless device 304a can control the communication of the second wireless device 304b. The user interface 3002 may also be configured to indicate the presence of a second wireless device 304b while the computing device 310 is connected to the first wireless device 304*a*. Therefore, to eliminate the interference (i.e. incorrect pairing that may be caused due to the presence of the second wireless device) the shifting of position of the first wireless device 304*a* can be effected (described in detail with reference to FIGS. 3C, 3D, 3E, 3F, and 3G).

Now referring to FIGS. 3C, 3D, 3E, 3F, and 3G illustrating block diagrams to describe a mechanical antenna slide mechanism in accordance to an aspect of the invention.

Figure 3D:
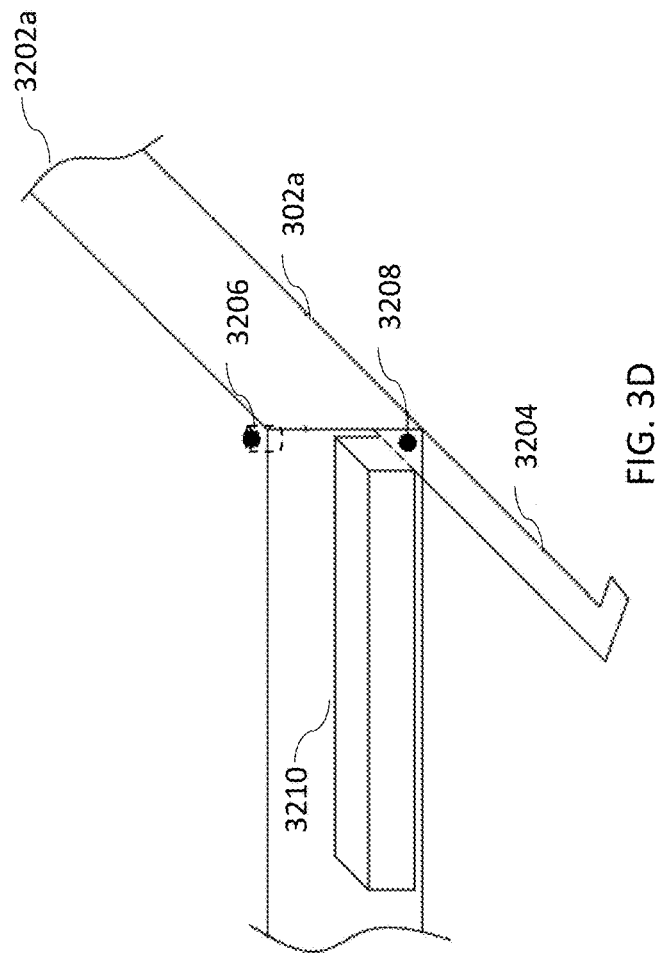
Figure 3C:
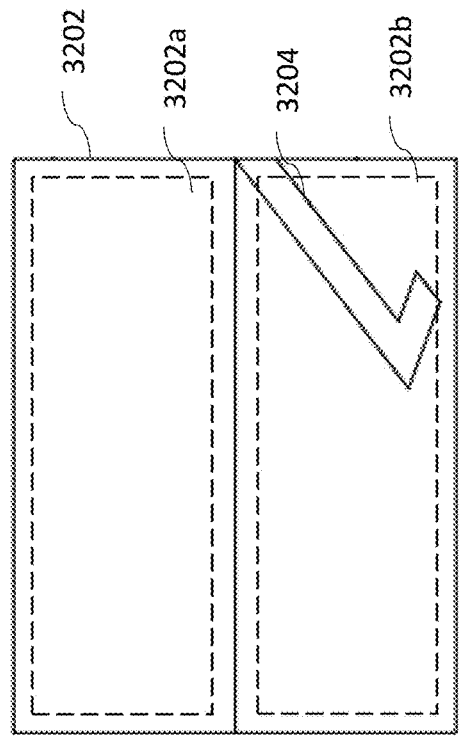

FIG. 3C illustrates a general server rack 3202 having seats 3202*a* and 3202*b* in order to seat in servers 302*a* and 302*b* configured for short range communication. Server rack 3202 includes a rack insertion lever 3204 that is used to seat in the servers like server 302*a* and 302*b* within the server racks seats 3202*a* and 3202*b*. The inward and outward motion of the rack insertion lever 3204 seats in and seats out servers like 302*a*, or 302*b* within and from the server rack seat 3202*a* and 3202*b*.

FIG. 3D illustrates more detailed plan of the antenna slide mechanism 3210. The server 302*a* when placed in server rack seat 3202*a* is displayed in FIG. 3D. The server 302*a* includes the antenna sliding mechanism 3210. The server rack 3202 also includes a detent ball receptacle 3206 in order to house a detent ball from any adjacent server placed above the server 302*a*. The detent ball 3208 is provided in order to activate the antenna sliding mechanism 3210 of the adjacent server that might be placed. Such a ball may be present in every adjacent server to be placed on top of other servers.

Moving on to FIG. 3E, that illustrates the further details of the antenna sliding mechanism 3210, that includes a sliding rod 3212. The antenna sliding mechanism 3210 further includes a spring 3214, enclosed within the sliding rod 3212, and connected to an antenna holding mechanism 3218 at one end and is connected to the rack insertion lever 3204 at other end. The antenna holding mechanism 3218 is configured to hold the antenna 304*a*. Further, the antenna sliding mechanism includes a wire 3216 that runs through within the spring 3214. The wire 3216 is connected at one end to the antenna holding means 3218 at one end and to rack insertion lever at other end, details of which will be described later. The antenna sliding mechanism 3210 further, includes a replacement mechanism 3222 in order to place the antenna 304*a* at its's original place after it slides to an auxiliary position.

FIG. 3F displays further details of the antenna sliding mechanism 3210. As described earlier the wire 3216 that runs through the spring 3214, is connected to the rack insertion lever 3204 through its stub 32042. In this configuration, whenever, the rack insertion lever 3204 is moved inside to seat the server 302*a*, the wire 3216 is pulled in by the movement of the rack insertion lever stub 32042 outwards. The inward movement of the wire 3216 compresses the spring 3214 as it is connected to the antenna holding mechanism 3218 at one end. The compression force causes the spring to compress and the antenna holding mechanism 3218 slides inside on the sliding rod 3212. As shown in FIG. 3F, there is also included a trigger 32042 present on the antenna holding means 3218 working of which will be described with reference to FIG. 3G.

Figure 3G:
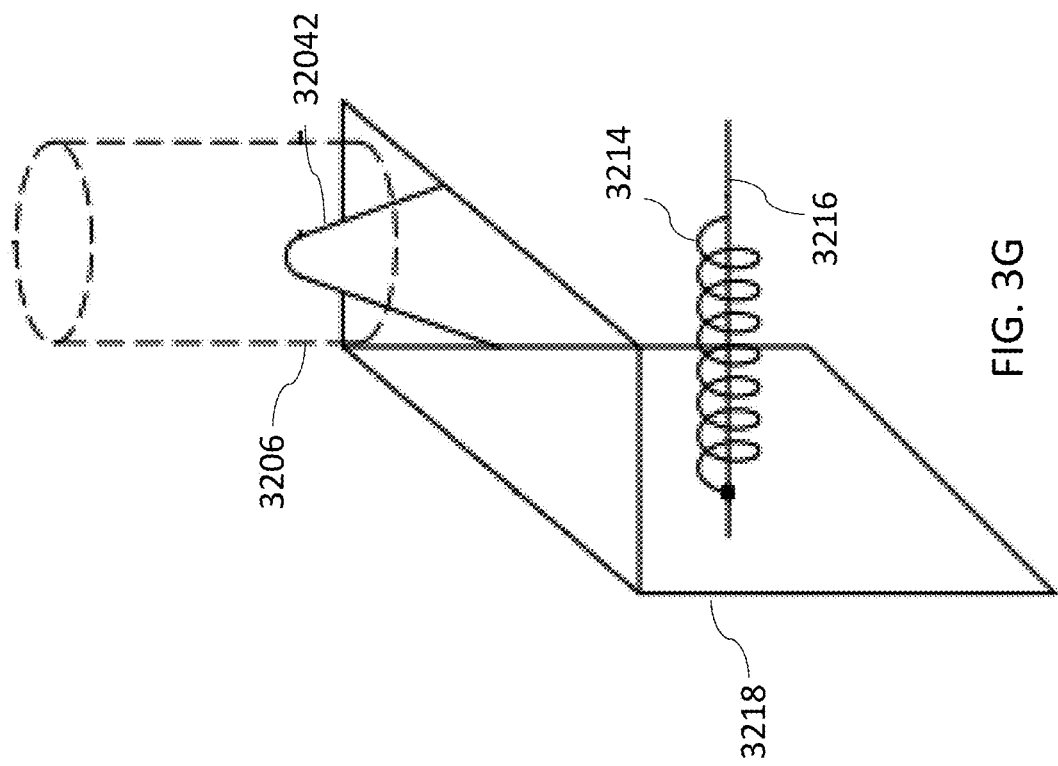

Now, referring to FIG. 3G, as the spring 3214 compresses due to the pulling of the wire 3216 due to rack insertion lever 3204 moving in to seat server 302*a*, the antenna holding mechanism 3218 moves inside towards the end of the rack insertion lever 3204. The compression of the spring 3216 continues till the trigger 32042 gets placed in the detent receptacle 3206 like as shown in the FIG. Every server, to be placed in this arrangement may include a detent ball mechanism like the detent ball 3208 of server 302*a* as shown in FIG. 3D. However, it is to be noted that whenever, the server 302*a* has its detent ball 3208 deployed, it disarms the trigger such that the antenna 304 is placed in its second position only. Whenever, an adjacent server is placed on rack above the detent ball would get placed within the detent ball receptacle 3206 and will hence remove the trigger 32042 from it. Due the trigger 32042 getting released, the spring 3214 expands and loosens the wire 3216 as well thereby moving the antenna 304*a* from a second position where the second server 302*b* antenna 304*b* might interfere. This trigger mechanism slides the antenna holding mechanism 3218 slides on the sliding rod 3212 in order to reach to a first position where the second server 302*b* might not interfere. Since, antennae of both servers are not in line of communication of each other and therefore, can connect with the wireless device 310 without any interference caused due to multiple antennae being present. The user of the wireless device 310, may be notified through the user interface 300 whether there is any interference or not. Therefore, the ball from server 302*a* would release spring on server 302*b*, which would disable ball on server 302*b* and slide the antenna 304*a* over to the first position from its second position.

The replacement mechanism 322 is connected to the rack insertion lever 3204 in such a way (mechanism not shown in FIG.) that when the rack insertion lever is opened to take out the server 302*a* or replace it, the antenna sliding mechanism 3218 is pushed to the second position. This may be realized by connecting a wire in a manner similar to the wire 3216 and connected to the rack insertion lever 3204 running through a spring in replacement mechanism 322.

Figure 3H:
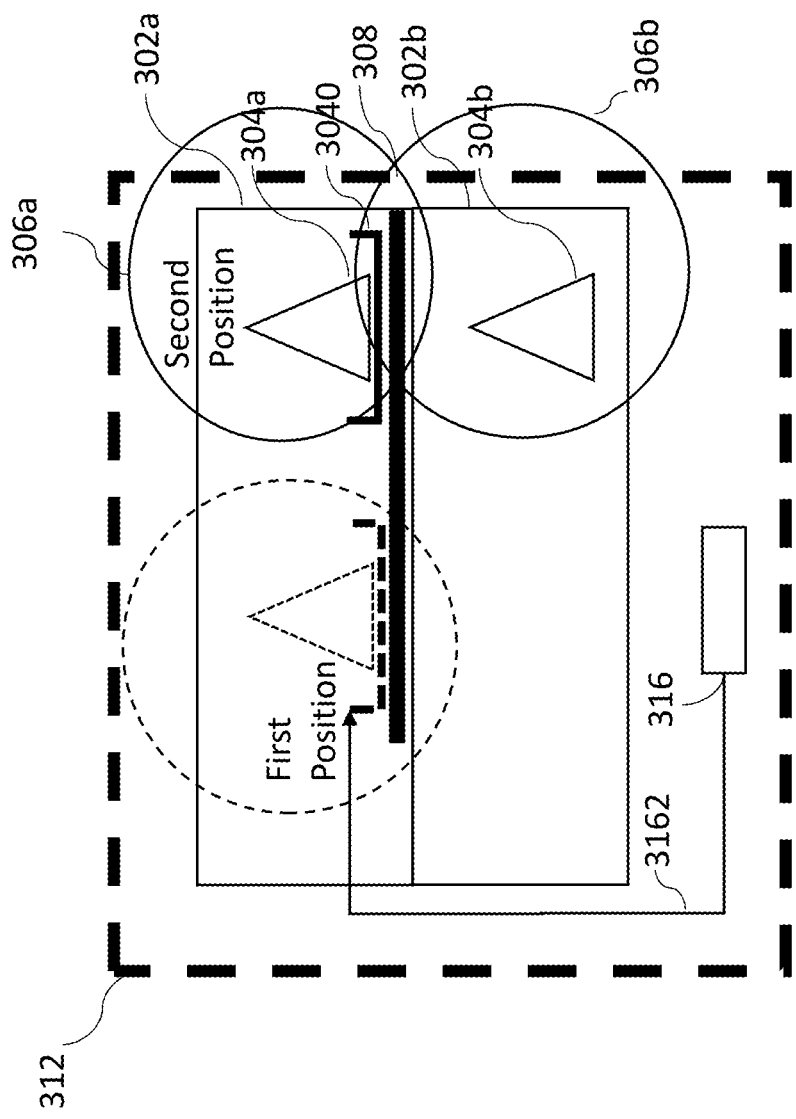
FIG. 3H is a block diagram depicting an electronic antenna sliding mechanism according to embodiments of the present disclosure.

Now referring to FIG. 3H which depicts the shifting mechanism according to embodiments of the present disclosure. The first server 302*a* includes a sliding mechanism 3040 on which the first wireless device 304*a* is placed. When the first wireless device 304*a* detects the presence of a second wireless device 304*b* in close proximity that may induce wrong pairing with the user device 310, the wrong pairing shifting may be performed. An electric motor 316 is connected to the sliding mechanism 3040 through connect wire 3162. The mechanism is under user's control through the user interface 3002. When the user chooses to connect with the first wireless device 304*a*, to avoid incorrect pairing due to the interference zone 308 generated by the overlapping of the range of effect 306*a* and 306*b* of the first wireless device 204*a* and the second wireless device 204*b* respectively, the first wireless device 304*a* may be shifted. The first wireless device 304*a* can be shifted with the help of the electric motor 316. The electric motor 316 on actuation powers the sliding mechanism 3040 and slides the first wireless device to a first position wherein the second wireless device cannot interfere in pairing with the user device 310.

Figure 4:
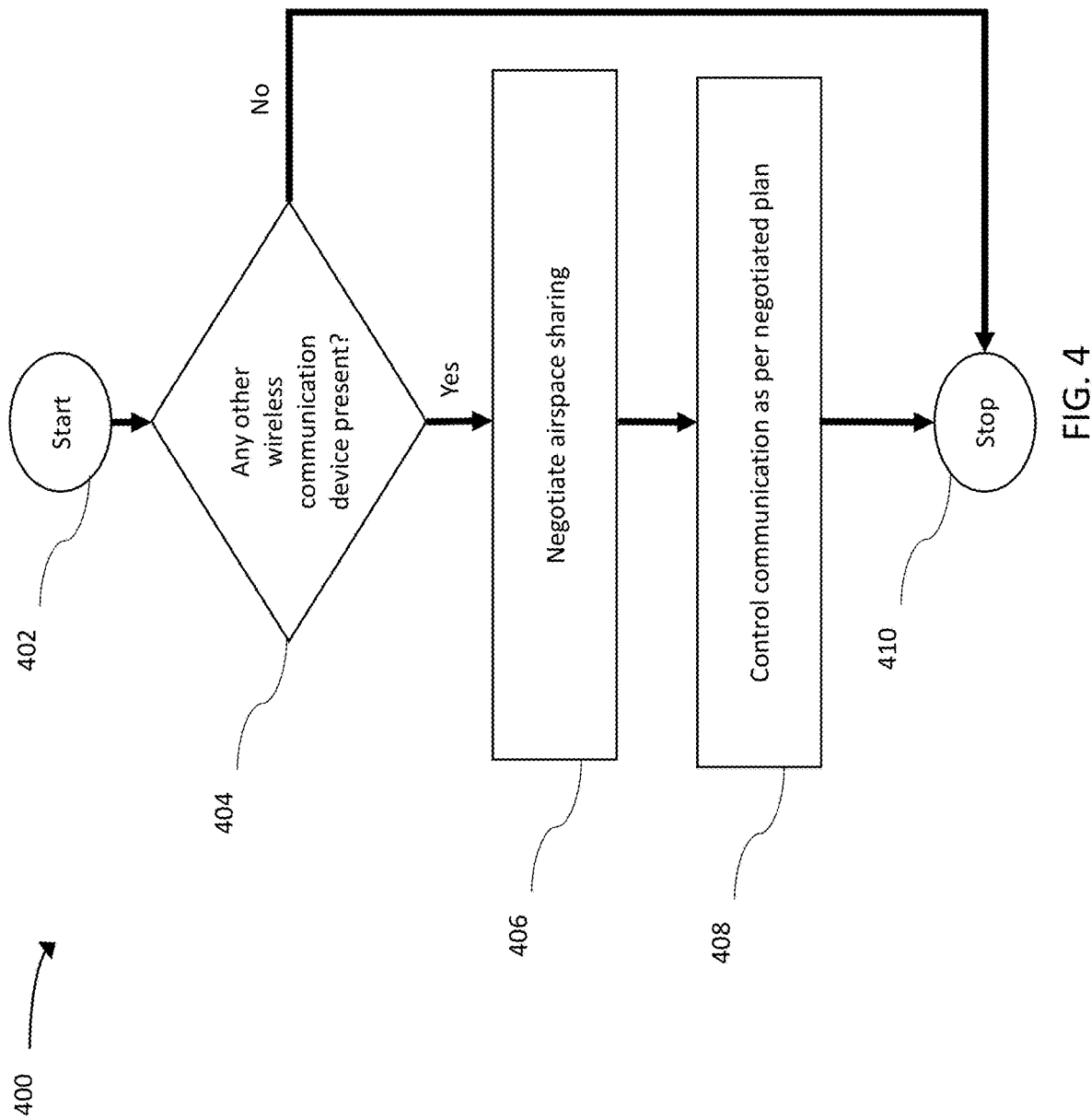
FIG. 4 is a flow chart depicting an example method for reducing interference in wireless communication according to embodiments of the present disclosure.

Now referring to FIG. 4, the figure depicts a flowchart of an example method for reducing interference in wireless communication in accordance with embodiment of the present disclosure. Particularly, method 400 may be used to control pairing function between closely placed short range wireless devices (such as wireless devices 204*a* and 204*b*) and the user device 210 trying to communicate with any of the wireless devices. Reference will be made to FIG. 2A by example while describing FIG. 4, although it should be understood that the method may similarly be applied to other suitable computing devices. The method begins at step 402 where first wireless device 204*a* is connected to the user device 210 and ready to communicate. Moving to step 404, first wireless device 204a determines whether there is present second wireless device 204b in close proximity that might interfere with the communication between the first wireless device 204a and the user device 210. If the second wireless device 204b is not present, the method may stop at step 410. However, if presence of second wireless device 204b is determined, the first wireless device 204a, at step 406, may negotiate an airspace sharing plan with second wireless device 204b to communicate with the user device 210 without an interference.

Continuing with method 400, at step 408, the first wireless device controls the communication with the connected user device 210 as per the negotiated sharing plan with second wireless device 202b. For this, first wireless device 202a may be operably connected to a user interface 2102 that is configured to receive user input in order to control communications as per the negotiated sharing plan. The method may stop at step 410.

Figure 5:
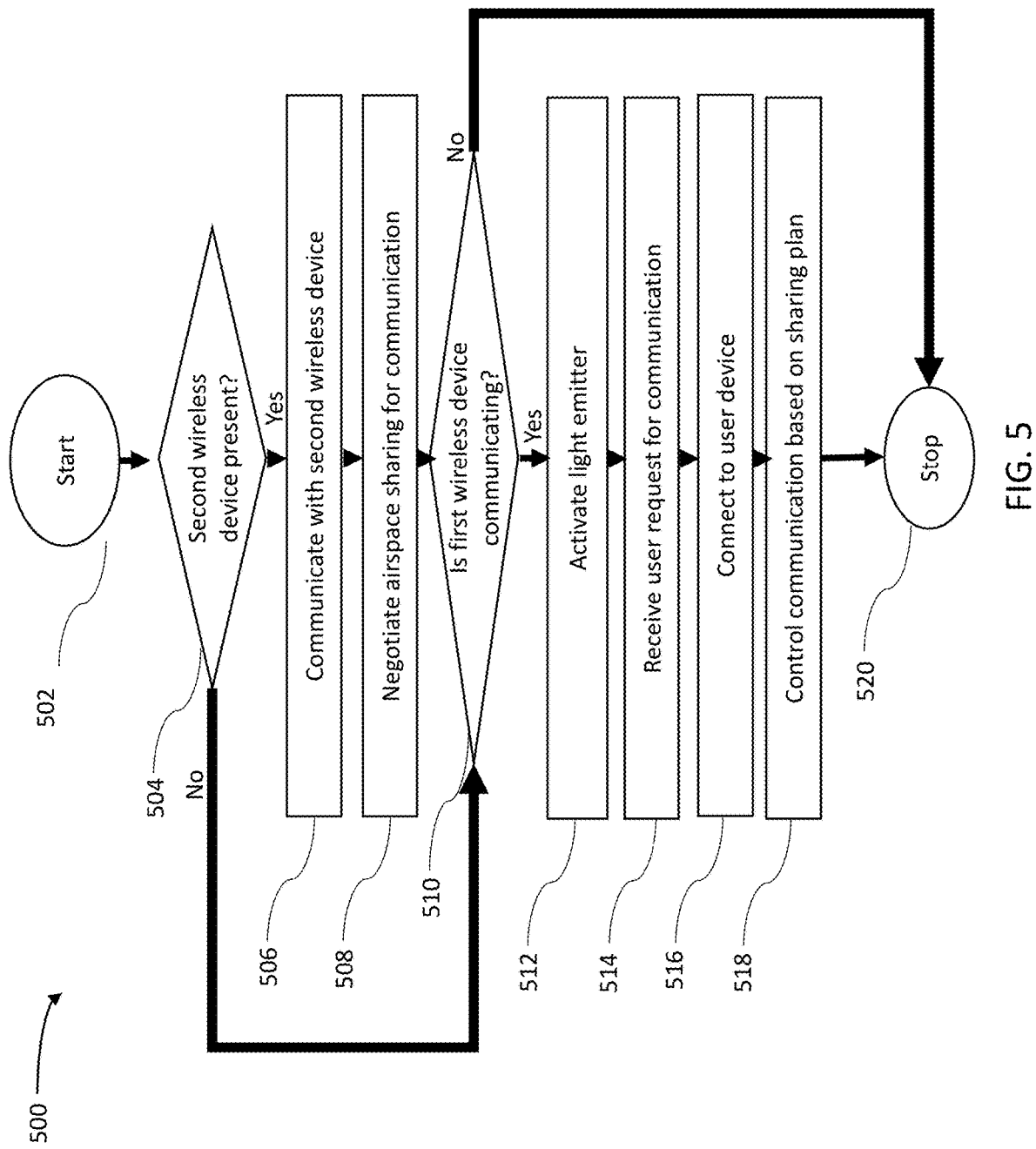
FIG. 5 is a flow chart depicting another example method for reducing interference in wireless communication according to embodiments of the present disclosure.

Now referring to FIG. 5, the figure illustrates a flowchart of an example method 500 for controlling control pairing function between closely placed short range wireless devices like the wireless device 204a, and 204b and the user device 210 trying to communicate with any of the wireless devices 204a, and 204b. References will be made to FIG. 2A by example while describing FIG. 5, although it should be understood that the method may alternatively be implemented by other suitable computing devices. Method 500 begins at step 502. Subsequently at step 504, it is determined if there is any second wireless device 204b present in close proximity to the first wireless device 204a. If presence of the second wireless device 204b is not determined, then the method jumps to step 510 (described later). However, if presence of the second wireless device 204b is determined, then at step 506, first wireless device 204a communicates with second wireless device 204b. On a successful communication, at step 508, first wireless device 204a negotiates with second wireless device 204b an airspace sharing plan for communication to avoid any incorrect pairing. In embodiments of the present disclosure, the airspace sharing plan may be that the first wireless device 204a is active for even intervals whereas the second wireless device 204b is active for another even interval wherein, the interval duration is negotiated between the wireless devices 204a, and 204b.

Still referring to method 500, at step 510, it is determined if first wireless device 204a is in a communicating state. The first wireless device 204a is determined to be in active communicating state while it is in active state as per the airspace sharing plan that has been negotiated between the two wireless devices. In order to visually indicate the active communication stage of the first wireless device 204a, at step 512, the indicator 2042a present within the first wireless device 204a (as described with description for FIG. 2A) is activated to blink. In embodiments of the present disclosure, the indicator 2042a may be an LED, a seven segment display, or the like. Thereby, visually indicating the active state of the first wireless device so as to avoid wrong pairing of the user device 210.

Continuing with method 500, at step 514, first wireless device 204a receives a connection request by the user device 210. The connection request may be sent through user interface 2102 available on user device 210. In other embodiments of the present disclosure, the user interface 2102 may also be present on the server 202a itself. Moving further to step 516, the first wireless device 204a connects to the user device 210 and starts data exchange. Moving to step 518, the communication between the first wireless device 204a and the user device 210 is controlled as per the plan negotiated between the first wireless device 204a and the second wireless device 204b of sharing the airspace for communication. At step 520, the method 500 is stopped.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a second wireless communication device operably connected to a second server:
determining presence of a first wireless communication device operably connected to a first server, that is configured to wirelessly communicate information associated with the first server, and that is within a predetermined proximity of the second wireless communication device;
negotiating with the first wireless communication device to establish a plan for sharing wireless communication airspace between the first wireless communication device and the second wireless communication device, wherein the plan comprises activating the first wireless communication device at a first predetermined time duration and activating the second wireless communication device at a second predetermined time duration different from the first predetermined time duration, the first predetermined time duration and second predetermined time duration being negotiated between the first and second wireless communication devices;
in response to the plan being established, presenting to a user of a computing device an indication of when the second wireless communication device is active in accordance with the established plan for presentation to a user of the second wireless communication device;
receiving, from the computing device, indication of user input for requesting wireless communication with the second wireless communication device; and
in response to receiving the indication of user input for requesting wireless communication, controlling communication of the first wireless communication device and the second wireless communication device such that communication by the second wireless communication device controls over communication by the first wireless communication device based on the established plan for sharing wireless communication airspace.

2. The method of claim 1, wherein the first wireless communication device and the second wireless communication device are powered near field communication (NFC) devices.

3. The method of claim 1, wherein the second wireless communication device is operably connected to a light emitter, and
wherein the method further comprises:
determining whether the second wireless communication device is communicating; and
in response to determining that the second wireless communication device is communicating, activating the light emitter for emitting light.

4. The method of claim 1, wherein the plan is a communication time division plan among the first and second wireless communication devices for time slicing an airspace channel near the first and second wireless communication devices; and wherein controlling communication comprises controlling the first communication device to communicate in accordance with the communication time division plan.

5. The method of claim 1, wherein the first and second servers are arranged in a server farm.

6. The method of claim 1, wherein controlling communication comprises controlling the second wireless communication device to communicate when the first wireless communication device is not communicating based on the plan.

7. The method of claim 1, wherein determining presence of the first wireless communication device comprises communicating with the first wireless communication device for establishing the plan.

8. A system comprising:
a second wireless communication device operably connected to a second server, wherein the second wireless communication device is configured to:
determine presence of a first wireless communication device that is configured to wirelessly communicate information associated with the first server, and that is within a predetermined proximity of the second wireless communication device;
negotiate with the first wireless communication device to establish a plan for sharing wireless communication airspace between the first wireless communication device and the second wireless communication device, wherein the plan comprises activating the first wireless communication device at a first predetermined time duration and activating the second wireless communication device at a second predetermined time duration different from the first predetermined time duration, the first predetermined time duration and second predetermined time duration being negotiated between the first and second wireless communication devices;
in response to the plan being established, present to a user of a computing device an indication of when the second wireless communication device is active in accordance with the established plan for presentation to a user of the second wireless communication device;
receiving, from the computing device, indication of user input for requesting wireless communication with the second wireless communication device, and
in response to receiving the indication of user input for requesting wireless communication, control communication of the first wireless communication device and the second wireless communication device such that communication by the second wireless communication device controls over communication by the first wireless communication device based on the established plan for sharing wireless communication airspace.

9. The system of claim 8, wherein the first wireless communication device and the second wireless communication device are powered near field communication (NFC) devices.

10. The system of claim 8, wherein the second wireless communication device is operably connected to a light emitter, and
wherein the second wireless communication device:
determines whether the second wireless communication device is communicating; and
activate the light emitter for emitting light in response to determining that the second wireless communication device is communicating.

11. The system of claim 8, wherein the plan is a communication time division plan among the first and second wireless communication devices for time slicing an airspace channel near the first and second wireless communication devices; and
wherein the second wireless communication device communicates in accordance with the time communication time division plan.

12. The system of claim 8, wherein the first and second servers are arranged in a server farm.

13. The system of claim 8, wherein the second wireless communication device communicates when the first wireless communication device is not communicating based on the plan.

14. The system of claim 8, wherein the second wireless communication device communicates with the first wireless communication device for establishing the plan.

* * * * *